US007171223B2

(12) United States Patent
Herscovich et al.

(10) Patent No.: US 7,171,223 B2
(45) Date of Patent: Jan. 30, 2007

(54) AUTOMATIC ANTENNA SELECTION FOR MESH BACKHAUL NETWORK NODES

(75) Inventors: Bernard Herscovich, Kanata (CA); Stephen G. Rayment, Ottawa (CA); Roland A. Smith, Nepean (CA)

(73) Assignee: Belair Networks, Inc., Ottawa (CA)

( * ) Notice: Subject to any disclaimer, the term of this patent is extended or adjusted under 35 U.S.C. 154(b) by 432 days.

(21) Appl. No.: 10/340,148

(22) Filed: Jan. 10, 2003

(65) Prior Publication Data

US 2004/0137924 A1   Jul. 15, 2004

(51) Int. Cl.
H04B 7/00   (2006.01)
(52) U.S. Cl. .................. 455/500; 455/561; 455/101
(58) Field of Classification Search ............... 455/101, 455/129, 269, 272, 575.7, 500, 63.4, 25, 455/562.1; 370/334
See application file for complete search history.

(56) References Cited

U.S. PATENT DOCUMENTS

| 6,195,559 | B1 * | 2/2001 | Rapeli et al. ............... 455/500 |
| 6,308,085 | B1 | 10/2001 | Shoki |
| 6,320,898 | B1 | 11/2001 | Newson et al. |
| 6,330,433 | B1 | 12/2001 | Jager |
| 6,445,688 | B1 * | 9/2002 | Garces et al. ............... 370/334 |
| 6,466,771 | B2 * | 10/2002 | Wood, Jr. .................... 455/101 |

(Continued)

FOREIGN PATENT DOCUMENTS

| WO | WO 00/11903 | 3/2000 |
| WO | WO 02/078209 | 10/2002 |

OTHER PUBLICATIONS

Sayeed Z., "Throughput Analysis and Design of Fixed and Adaptive ARQ/Diversity Systems for Slow Fading Channels," Global Telecommunications Conference, 1998. Globecom 1998. The Bridge to Global Integration, IEEE Sydney, NSW, Australia Nov. 8-12, 1998, Piscataway, NJ, USA, IEEE, pp. 3686-3691.

Primary Examiner—Quochien B. Vuong
Assistant Examiner—Michael Chu
(74) Attorney, Agent, or Firm—Cassan Maclean

(57) ABSTRACT

Methods and devices related to wireless networking. A wireless device has multiple directional antennas and multiple backhaul radio modules which provide point to point wireless links with other wireless devices. Each radio module can use any one of the available directional antennas to link to one other routing device. Antennas are automatically selected for each wireless device by merely setting one device in a "hunt" mode and setting another device in a "listen" mode. Devices in a hunt mode cycle through the available antennas by sequentially transmitting transmit messages to devices in the listen mode using each of the available antennas in turn. Devices in the listen mode also cycle through their available antennas by sequentially "listening" for transmit messages. A listen mode device, receives transmit messages on each of its available antennas, and, after gathering the relevant data, determines which of its antennas is best suited for communicating with the hunt mode device. The listen mode device antenna which is best suited is then used to transmit a response message to the hunt mode device. This listen mode device antenna is thus configured for communicating with the hunt mode device. Similarly, when the hunt mode device receives the response message, it designates its antenna which transmitted the transmit message as being configured for communications with the listen mode device.

8 Claims, 9 Drawing Sheets

U.S. PATENT DOCUMENTS

| | | | |
|---|---|---|---|
| 6,522,642 B1 * | 2/2003 | Scott | 370/342 |
| 6,865,169 B1 * | 3/2005 | Quayle et al. | 370/335 |
| 2001/0039198 A1 | 11/2001 | Onishi et al. | |
| 2002/0028655 A1 | 3/2002 | Rosener et al. | |
| 2002/0164963 A1 * | 11/2002 | Tehrani et al. | 455/101 |

* cited by examiner

AUTOMATIC ANTENNA SELECTION FOR MESH BACKHAUL NETWORK NODES

FIELD OF THE INVENTION

The present invention relates to wireless communications networks and, more specifically, is applicable but not limited to methods and devices for use in a wireless backhaul network.

BACKGROUND OF THE INVENTION

The communications revolution of the past few years has seen an explosion in the number of wireless devices. Cellular telephones, personal digital assistants (PDAs), laptops, and other consumer devices are using wireless technology to provide connectivity to their users. Wireless technology is currently being used to provide voice-based services for cellular and PCS (Personal Communication Services) telephones, with increasing need for into building coverage. PDAs and laptops can now access the Internet and local dedicated intranets, giving end users access to not only email but also to World Wide Web based content. The increased demand for access to more services in more locations imposes higher performance demands on the wireless infrastructure.

One major problem facing wireless networks is backhaul data transmission. As cellular and PCS voice utilization inside buildings increases and as the data transfer rate provided to the end user increases, the backhaul network feeding the localized wireless nodes gets heavily burdened. Each local wireless node servicing local wireless end users must be fed traffic from public and/or private, voice and/or data networks. As each end user demands coverage in more areas and higher data throughput, the backhaul network, the network that feeds the localized wireless nodes that actually distribute data traffic to individual end users, has to provide more and more data capacity. Further, as wireless data speed requirements increase, cell sizes—the area serviced by the localized wireless nodes—must shrink. As cell density increases, then, so does the number of backhaul nodes and links that are needed to feed the cells. In fact, the number of backhaul links increases inversely with the square of the wireless nodes' cell radius.

Because of the above, high speed, high capacity wireless networks have generally been limited by backhaul bandwidth. Such bandwidth, previously provided by copper, optical or microwave radio links, comes at a very great cost to the operator and deployer of the wireless network. A wireless backhaul is clearly an attractive alternative. In particular, a wired backhaul is expensive to deploy as physical connections must be run to each node.

One problem with wireless backhaul networks is the need for point to point links between the backhaul nodes in the backhaul network. Installing such backhaul nodes requires extensive set up costs in terms of time and labor as the installation team has to manually point, configure, and setup each backhaul node. Not only that but the process for ensuring that one wireless backhaul antenna lines up with a corresponding antenna at another node may require two teams—one at one node and another at the other node to ensure that data is being received properly at either end of the link.

Another issue with some backhaul wireless networks is their limitation to a two dimensional plane. Obstacles between two backhaul nodes are usually overcome by setting up more nodes that circumvent the obstacles on one plane. The approach usually requires more nodes deployed and increased overhead and increased probabilities of problems.

Based on the above, there is therefore a need for solutions and alternatives that at least mitigate, if not overcome, the limitations of the prior art. Such solutions and alternatives should simplify the installation and configuring process while allowing full backhaul capabilities for a lesser number of nodes.

SUMMARY OF THE INVENTION

The present invention provides methods and devices related to wireless networking. A wireless device has multiple directional antennas and multiple backhaul radio modules which provide point to point wireless links with other wireless devices. Each radio module can use any one of the available directional antennas to link to one other routing device. Antennas are automatically selected for each wireless device by merely setting one device in a "hunt" mode and setting another device in a "listen" mode. Devices in a hunt mode cycle through the available antennas by sequentially transmitting transmit messages to devices in the listen mode using each of the available antennas in turn. Devices in the listen mode also cycle through their available antennas by sequentially "listening" for transmit messages. A listen mode device, receives transmit messages on each of its available antennas, and, after gathering the relevant data, determines which of its antennas is best suited for communicating with the hunt mode device. The listen mode device antenna which is best suited is then used to transmit a response message to the hunt mode device. This listen mode device antenna is thus configured for communicating with the hunt mode device. Similarly, when the hunt mode device receives the response message, it designates its antenna which transmitted the transmit message as being configured for communications with the listen mode device.

In a first aspect, the present invention provides a method for selecting an antenna in a first wireless device for communicating with a second wireless device, said first wireless device having at least two available antennas, the method comprising:

a) selecting a selected antenna from said at least two available antennas;

b) transmitting a specific transmit message to said second wireless device using said selected antenna;

c) waiting for a predetermined amount of time for a response message from said second wireless device;

d) in the event said response message is received, processing said response message to determine which of said at least two available antennas is to be designated for communicating with said second wireless device; and e) in the event said response message is not received, selecting another antenna from said at least two available antennas as the selected antenna and repeating steps b)–e).

In a second aspect, the present invention provides a method for selecting an antenna for use in communicating with a first wireless device, said antenna to be selected from at least two available antennas at a second wireless device, the method comprising:

a) selecting an antenna from said at least two available antennas as a selected antenna;

b) receiving at least one transmit message from said first wireless device using said selected antenna;

c) determining a quality of the or each transmit message;

d) in the event said quality conforms to a predefined criteria, transmitting a response message to said first device; and
e) in the event said quality does not conform to said predefined criteria, selecting another antenna from said at least two available antennas as the selected antenna and repeating steps b)–e).

In a third aspect, the present invention provides a wireless device for communicating with other wireless devices, said device comprising:
   at least two antennas;
   at least two radio modules, each radio module being for communicating with at least one other wireless device using one of said at least two antennas in a point to point wireless link; and
   a switch module for switching between said radio modules and said antennas such that each radio module can transmit or receive through any of said antennas, wherein each of said radio modules automatically select one of said at least two antennas for communicating with said at least one other wireless device.

In a fourth aspect, the present invention provides a method for configuring wireless devices, the method comprising:
   selecting a first wireless device;
   selecting a second wireless device to communicate with said first wireless device using a wireless link;
   configuring said first wireless device to operate in a listen mode, said listen mode causing said first wireless device to await a transmission from said second wireless device;
   configuring said second wireless device to operating in a hunt mode, said hunt mode causing said second wireless device to transmit messages to said first wireless device and wherein each of said first wireless device and said second wireless device automatically selects an antenna for optimal communications with each other.

In a fifth aspect the present invention provides an antenna subsystem for use by a wireless device, the subsystem comprising:
   a) at least two antennas;
   b) at least two radio modules; and
   c) a switch module for switching between said radio modules and said antennas such that each radio module can transmit or receive through any of said antennas.

In a sixth aspect, the present invention provides a method for selecting an antenna for use in communicating with a first wireless device, said antenna to be selected from at least two available antennas at a second wireless device, the method comprising:
   a) selecting an antenna from said at least two available antennas as a selected antenna;
   b) receiving transmit messages from said first wireless device using said selected antenna;
   c) determining a quality of said transmit messages;
   d) repeating steps a)–c) for each one of said at least two available antennas; and
   e) selecting one of said at least two available antennas for communicating with said first wireless devices based on said quality of received transmit messages.

BRIEF DESCRIPTION OF THE DRAWINGS

A better understanding of the invention will be obtained by considering the detailed description below, with reference to the following drawings in which.

DETAILED DESCRIPTION

Figure 1:
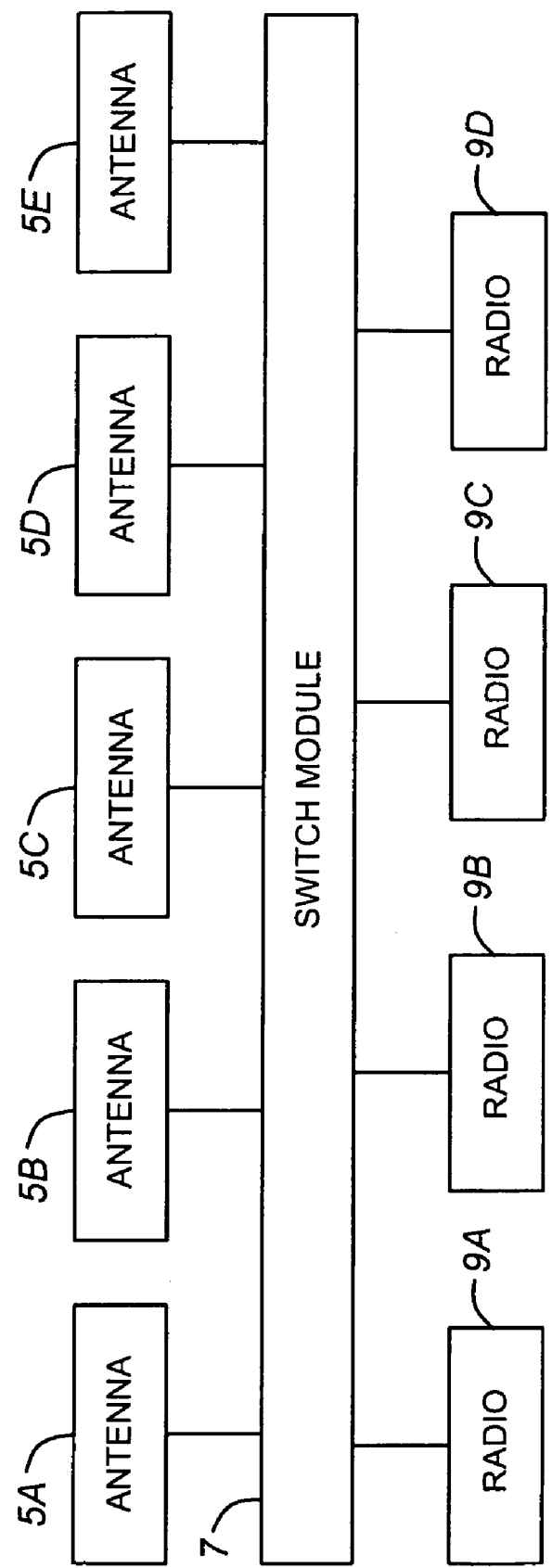
FIG. 1 is a block diagram of an antenna subsystem which may be used in wireless devices.

Referring to FIG. 1, a subsystem which may be used for a wireless communications device is illustrated. The subsystem consists of multiple antennas 5A–5E coupled to a switch module 7 which is, in turn, coupled to multiple radios 9A–9D. The switch module 7 allows any of the radios 9A–9D to use any of the antennas 5A–5E for transmitting signals, receiving signals, or both. The switch module may be a crossbar switch or any suitable switching system that allows radios to be coupled to antennas and vice versa. This subsystem allows the radios 9A–9D to select an antenna from the available antennas which is most suited for a particular task.

Figure 2:
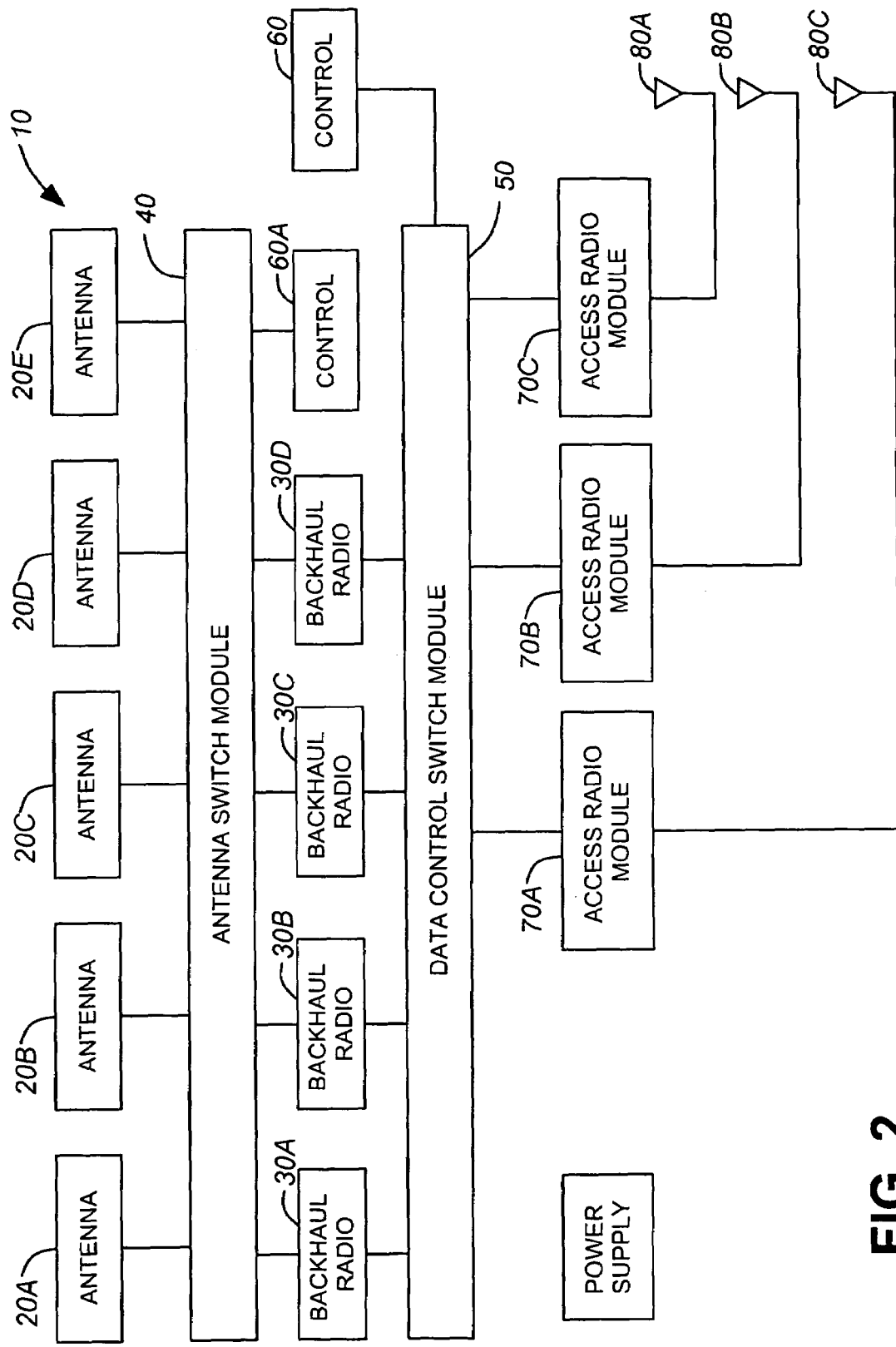
FIG. 2 is a block diagram of a wireless device incorporating the antenna subsystem of FIG. 1.
Figure 2A:
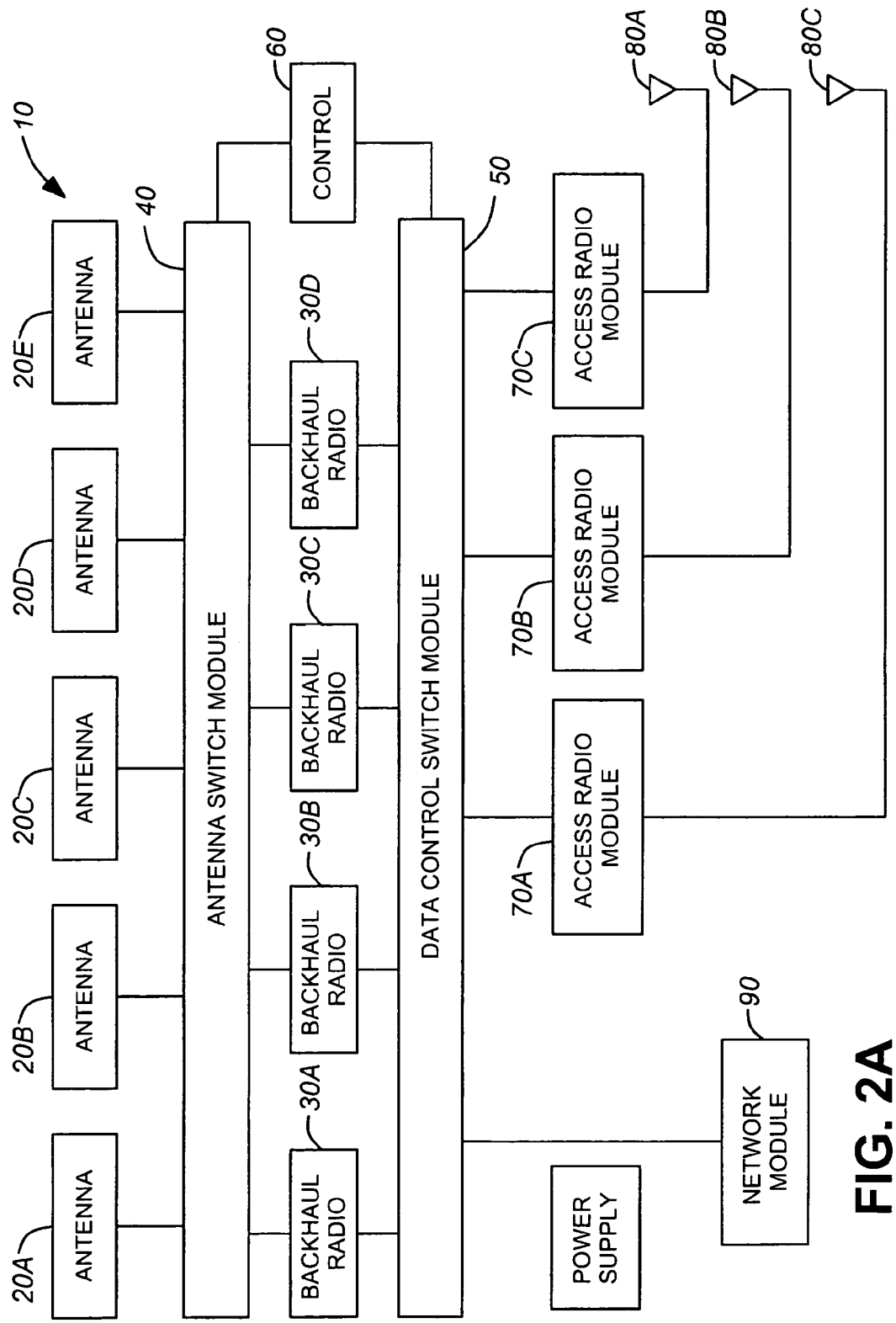
FIG. 2A is a block diagram of a variant of the wireless device of FIG. 2.

It should be noted that the antennas 5A–5E need not be of the same type or have the same function. These antennas may be polarization diversity antennas, spatial diversity antennas, directional antennas or any other type of antenna. Similarly, the radios 9A–9D need not be of the same type or function. For systems with different types of antennas and different radio types, each radio could cycle through the available antennas to find one that is best suited for that radio's specific task. Such a subsystem is well suited for a multiple radio and multiple antenna wireless communications device for use in wireless backhaul mesh networks. Such a device which uses such a subsystem is illustrated in FIGS. 2 and 2A. It should be noted that the subsystem of FIG. 1 may have any number of antennas and radios. There is no fixed relationship between the number of radios and antennas. Typically, any one of n radios would be capable of using any one of m antennas by way of the switch module 7.

Referring to FIGS. 2 and 2A, block diagrams of a wireless device are illustrated. The device 10 in FIG. 1 has multiple directional antennas 20A, 20B, 20C, 20D, 20E along with multiple backhaul radio modules 30A, 30B, 30C, 30D. An antenna switch module 40 connects the backhaul radio modules 30A–30D with the antennas 20A–20E. The backhaul radio modules 30A–30D are also coupled with a data control switch module 50 which is, in turn, coupled to control circuitry 60. Control circuitry 60A is coupled to the antenna switch module 40. The data control switch module

50 is also coupled to multiple access radio modules 70A, 70B, 70C. These access radio modules 70A–70C are each coupled to access antennas 80A, 80B, 80C, respectively. A power supply 90 provides power to all the modules in the device 10. While control circuitry 60A is illustrated as a single component in FIG. 2, this control circuitry 60A may, as an alternative, be distributed across the different backhaul radio modules 30A–30D.

Any one of the directional antennas 20A–20E can be coupled to any one of the backhaul radio modules 30A–30D through the antenna switch module 40. Thus, any one of the backhaul radio modules 30A–30D may receive or transmit through any one of the backhaul antennas 20A–20E.

The data control switch module 50 controls data flow between any of the backhaul radio modules 30A–30D and between any of the backhaul radio modules 30A–30D and any of the access radio modules 70A–70B. Each of the access radio modules 70A–70C is coupled to a specific access antenna 80A–80C. These access antennas 80A–80C are omnidirectional antennas and each of the access radio modules 70A–70C can transmit and receive wireless signals through the specific access antenna to which it corresponds.

A variant of the wireless device 10 is illustrated in FIG. 2A. This variant has an extra network module 90 coupled to the data control switch module 50. The network module 90 allows the wireless device 10 to connect to and communicate with other networks such as optical networks, landline network, copper based networks, and even other wireless networks different from the network in which the device 10 is operating. Also, the device 10 in FIG. 2A has a single control module 60 which controls both switch module 40 and switch module 50.

Data from either another wireless device or from the other network is received either from one of the directional antennas 20A–20E or the network module 90 (if present). This data is then routed back using its address, by way of the data control switch module, to another backhaul radio module, an access radio module, or to the network module 90. If routed to the network module 90, the data is sent via the other network to its ultimate destination. If routed to a backhaul radio module, the data is transmitted, through one of the directional antennas 20A–20E, to another wireless device and to its ultimate destination. Finally, if the data is routed to an access radio module, the data is transmitted, by way of an access antenna, to an end user.

The wireless device 10 can establish wireless point to point links with other wireless devices by way of the backhaul radio modules 30A–30D and the directional antennas 20A–20E. Each backhaul radio module 30A–30D receives, transmits (or both) to another wireless device by way of one of the directional antennas best positioned or best suited for the task. While the above-mentioned diagrams imply that the antenna are integral to the device 10, this is not necessary. Any of the antennas may be separately positioned away from the device 10.

It should be noted that even though the above described system employs the n×m multiple antenna/multiple radio subsystem for the backhaul wireless links, the same multiple antenna/multiple radio subsystem can be used for the access side. With such an implementation, multiple access radios would be capable of using any one of multiple access antennas to communicate with consumer wireless devices.

It should further be noted that the access radio modules 70A–70C, and the access antennas 80A–80C are optional to the device 10. The device 10 may be a wireless node in a wireless backhaul network that routes data between other nodes in the backhaul network. Similarly, the control circuitry 60, while illustrated as being centralized in FIG. 2A, may be distributed. In such a scheme, as shown in FIG. 2, the antenna switch module 40 and the data control switch module 50 would be separately and independently controlled.

The antenna switch module 40 may, depending on the implementation, switch different types of signals. The antenna switch module 40 may switch amplified, radio frequency (RF) signals from the radio modules 30A–30D to the antennas 20A–20E. Conversely, if amplification circuitry is integrated into the antennas 20A–20E, then the switch module 40 may switch pre-gain RF signals from the radio modules 30A–30D. In this case, a power amplifier is integrated into each of the antennas 20A–20E.

In another possibility, the switch module 40 may switch IF (intermediate frequency) signals from the radio modules 40. For this possibility, the power amplifier, low noise amplifier, and mixers are integrated with each of the antennas 20A–20E.

Yet another possibility is that the switch module 40 may switch base band signals from the radio modules 30A–30D. For this configuration, all the down-conversion circuitry would not be in the radio modules 30A–30D but would rather be with antennas 20A–20E.

Figure 3:
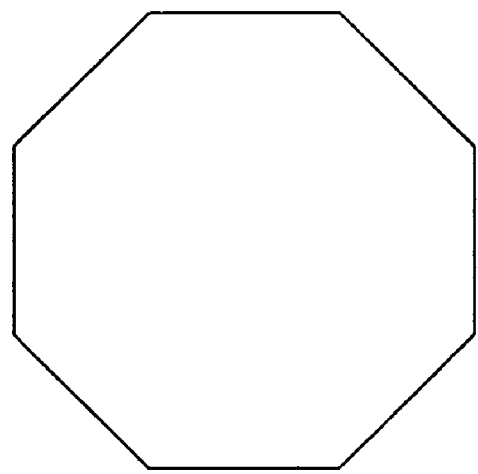
FIG. 3 is a view of a possible arrangement of antennas which may be used in the wireless devices of FIGS. 2 and 2A.
Figure 3A:
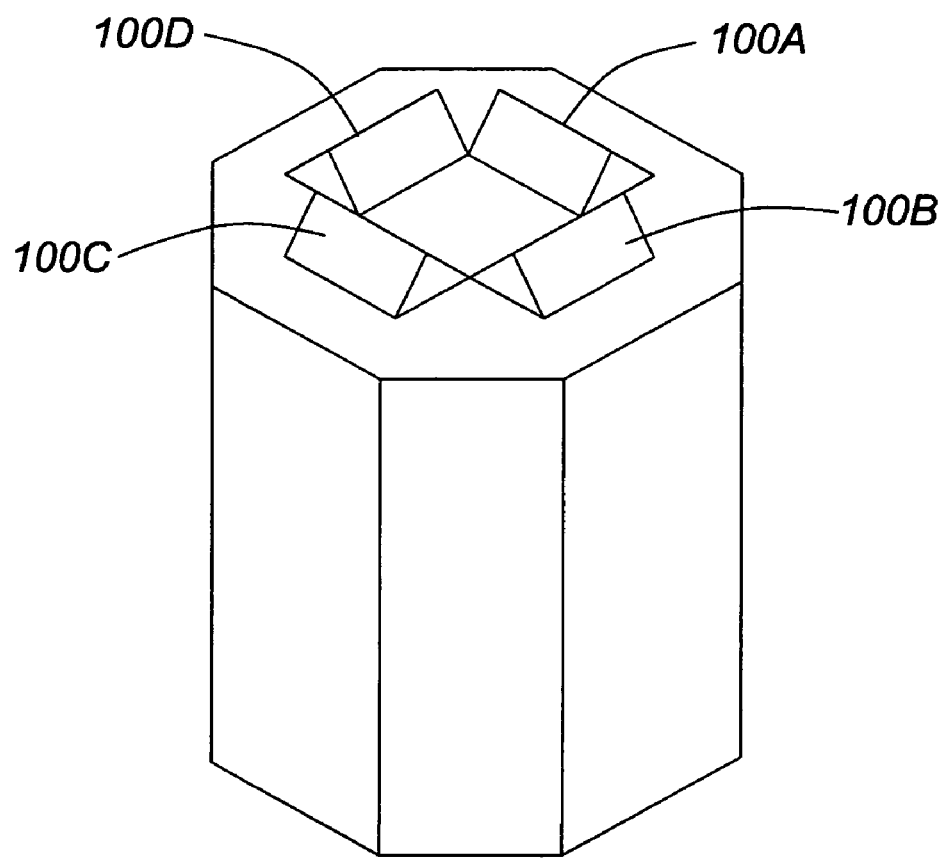
FIG. 3A is a perspective view of a variant of the wireless device of FIGS. 2 and 2A incorporating directional antennas that allow for three dimensional coverage.
Figure 4:
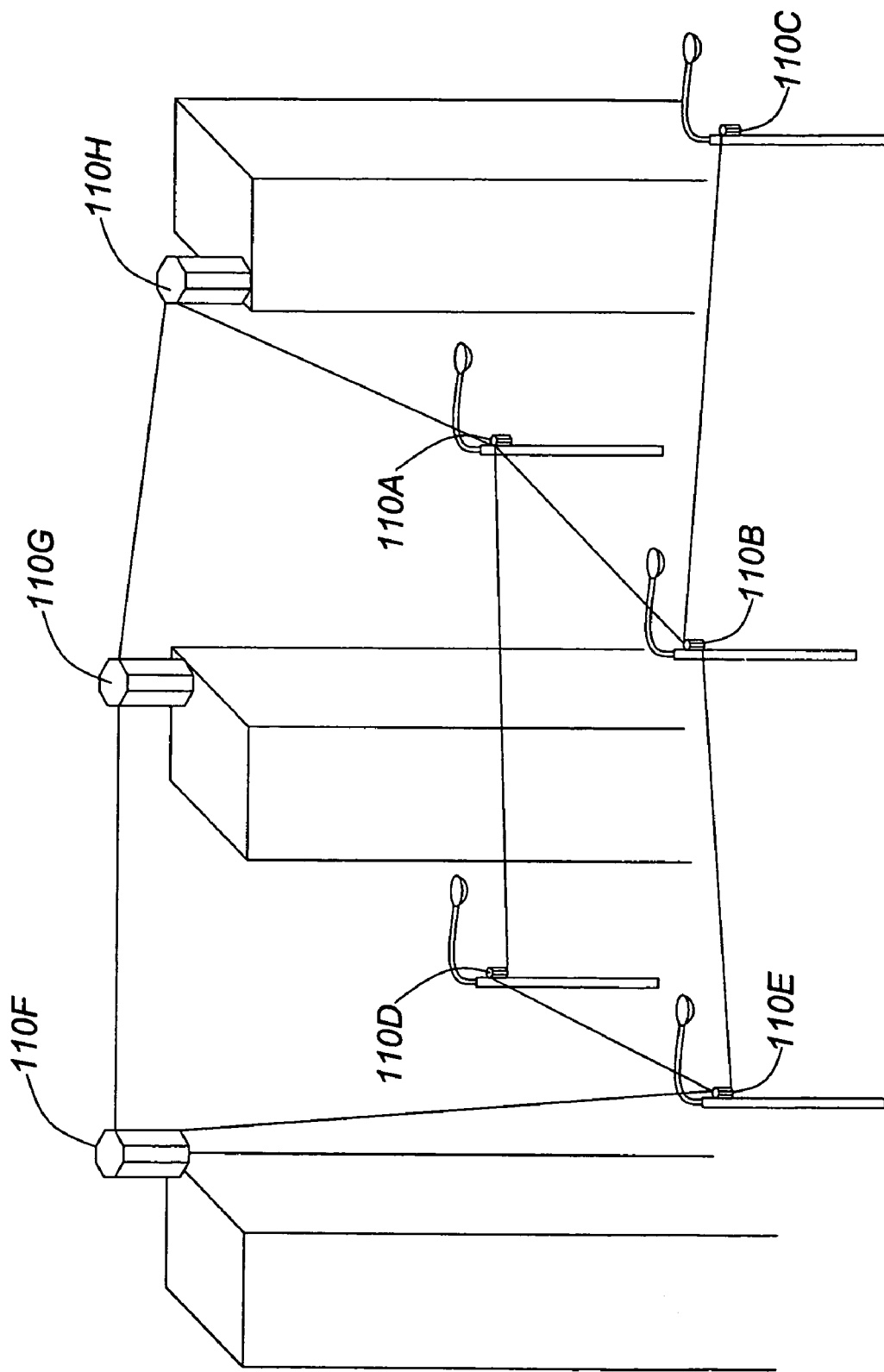
FIG. 4 is a diagram illustrating the wireless device of FIG. 3A and how it provides three dimensional coverage for a wireless mesh network.

Regarding the antenna array, in one embodiment, illustrated in a top down view in FIG. 3, eight directional antennas are positioned in a regular octagon with each face of the octagon corresponding to one directional antenna. This configuration allows for full 360° coverage of the area surrounding the wireless device with each directional antenna covering a 45° arc. However, this configuration only provides for linking with directional antennas that are substantially coplanar with the wireless device. This is solved by the embodiment illustrated as an isometric view in FIG. 3A. In this embodiment, an extra 4 directional antennas 100A, 100B, 100C, 100D are provided on top of the wireless device. This allows the wireless device to have a point to point wireless link with wireless devices that are deployed above it. Similarly, extra directional antennas can also be provided underneath the wireless device to allow the device to link with devices positioned below it. The coverage that these two sets of directional antennas allow is illustrated in FIG. 4. It should be noted that configurations that use the other numbers of antennas, such as 12 directional antennas in a dodecagon formation or 6 directional antennas in a hexagon formation, are possible.

Other arrangements of antennas may also be used. The three dimensional array of antennas has been described above. However, a planar array may also be used along with irregularly shaped polygons as arrangements for the antennas. Furthermore, the multiple antennas need not all be placed in a single location. It is possible to envision multiple antennas at different locations with multiple radios selecting the best placed antenna for its transmission and reception.

In FIG. 4 wireless devices 110A, 110B, 110C, 110D, 110E, 110F, 110G, 110H are coupled by wireless point to point links.

The directional antennas positioned on the outside of the wireless devices allow for links with coplanar devices (e.g. device 110G links with device 110F and device 110D links with devices 110A and 110E). However, the upper and lower antenna arrays also allow for 3 dimensional coverage as demonstrated by devices 110F, 110H, 110A and 110E. Device 110F has a point to point link with not only a coplanar device 110G but also with device 110E that is positioned below it. Similarly, device 110A is linked with coplanar devices 110B and 110D and with non-coplanar 110H.

The provision of directional antennas that allow for links with wireless devices positioned above or below a specific wireless device gives unprecedented flexibility in the deployment options for these devices. Now, instead of deploying multiple wireless devices that go around an obstacle on the ground plane, a single wireless device can be mounted on the obstacle, thereby allowing the wireless link to go over the obstacle as opposed to previously deploying the devices so that the link can go around the obstacle.

The number of directional antennas in such a wireless device would normally make the configuration and setup of the device tedious. However, the use of an automatic antenna selection process, such as the one explained below, would greatly simplify matters. With the use of such an automated process, wireless devices merely have to be "pointed" in the general direction of a corresponding wireless device. The automated process would then take over and automatically poll, select, and configure each backhaul radio module to use one of the available directional antennas as an optimum directional antenna for communicating with a specific other wireless device. Thus, in a wireless device A radio module A1 could be tasked with communicating with wireless device B. To do this, the backhaul radio module A1 would need to use one of the available directional antennas AA1–AA12 on device A. Similarly, wireless device B would also need to select which one of its available antennas BB1–BB5 is best suited for communicating with wireless device A. An example of the above is illustrated in FIG. 5.

Figure 5:
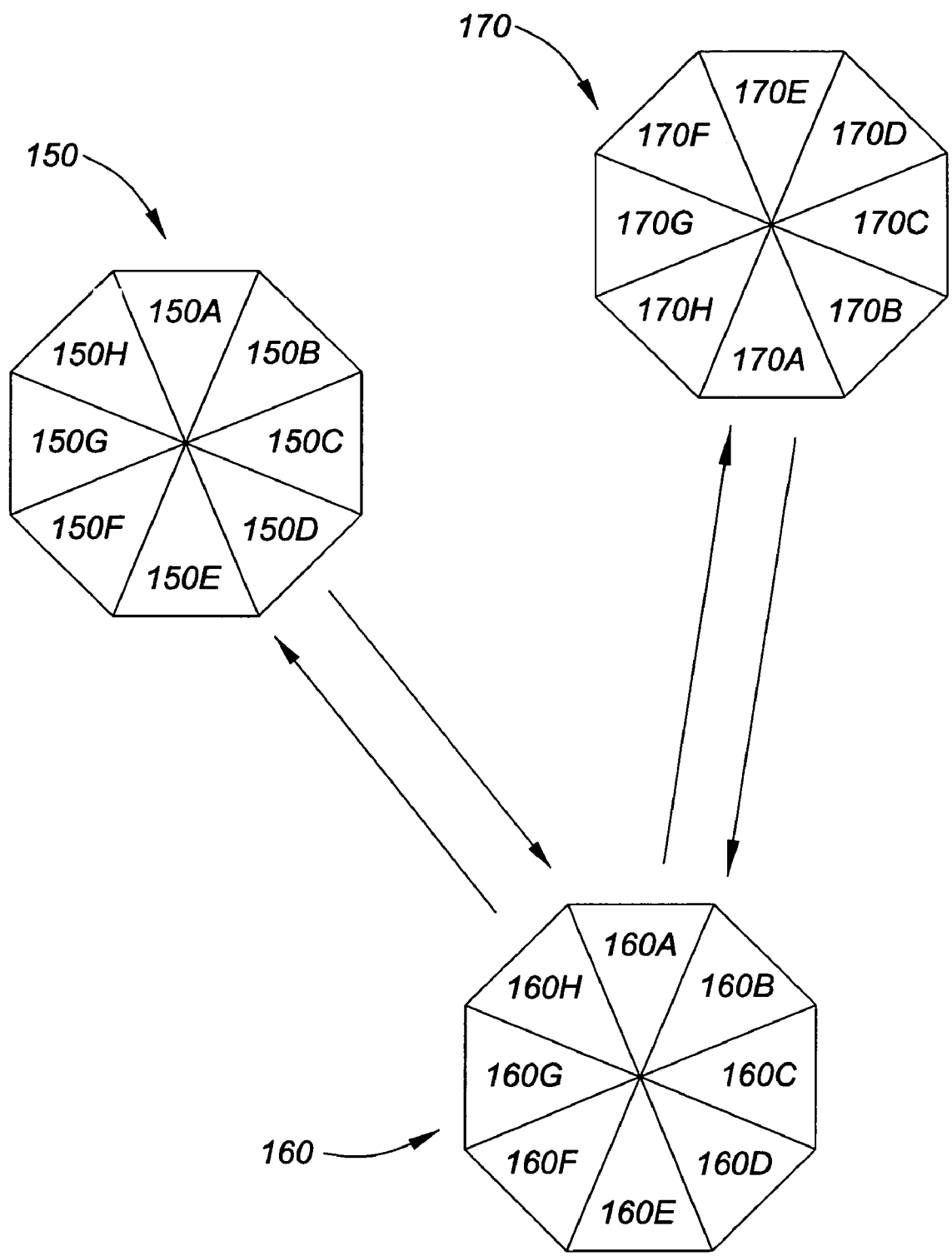
FIG. 5 is a block diagram of three wireless devices each with multiple antennas with each device communicating with at least one other wireless device.

In FIG. 5, the wireless device 150 needs to establish a link with wireless device 160 and with wireless device 170. However, wireless device 160 already has a link with wireless device 170 and so not all of the antennas on devices 160, 170 are available. For ease of reference, the wireless device 150 has directional antennas 150A–150H, the wireless device 160 has directional antennas has directional antennas 160A–160H, and the wireless device 170 has directional antennas 170A–170H. The directional antennas 170A and 160A are not available as they are designated for the point to point wireless link between the wireless devices 160 and 170. It should be noted that for each of representation, the wireless devices in the example each have only 8 directional antennas with each antenna covering a 45° arc.

To automatically select the optimum directional antennas for a wireless point to point link between two wireless devices, one device enters a "hunt" mode while the other enters a "listen" mode. The "hunt" mode device sequentially selects one of its available antennas and transmits a transmit message through this selected antenna. Similarly, the "listen" mode device sequentially selects of the its available antennas and "listens" for or receives transmit messages from the hunt mode device. Each transmit message that the listen mode device receives through its different directional antennas is then analysed for signal quality. Based on the analysis (during which specific metrics are calculated), one of the directional antennas on the listen mode device is designated for communications with the hunt mode device.

Once a directional antenna on the listen mode device is designated, a directional antenna on the hunt mode device must therefore be designated. Using the designated directional antenna on the listen mode device, the transmit messages are again received and analysed for signal quality. Based on this analysis (during which more metrics may be calculated), the listen mode device selects one of the transmitting antennas on the hunt mode device. The hunt mode device thus designates this selected directional antenna for communications with the listen mode device.

Regarding the metrics upon which the decision may be made, there may be any one or any combination of generally accepted measures of signal/transmission/link quality. As such, these may be signal strength, bit error rate, packet error rate, soft decision threshold, delay spread, and/or interference. Other measures of signal/transmission/link quality other that these listed above may be used.

Using this method, the general outlines of which are described above, the optimal antennas for point to point wireless link are thus chosen.

Returning to the example in FIG. 5, the wireless device 150 can be the hunt mode device while the wireless device 160 can be the listen mode device. As the listen mode device (device 160) cycles through its available directional antennas, it should be clear that directional antenna 160G should be optimally positioned for communicating with the hunt mode device (device 150). One this directional antenna 160G is designated, one of the hunt mode device antennas must be selected. As the hunt mode device cycles through its available antennas, it should be clear that directional antenna 1 50D of device 150 is optimally positioned to communicate with the directional antenna 160D on device 160.

Once wireless device 160 informs wireless device 150 that the antenna 150 D is the optimum antenna, device 150 then designates antenna 150D for communications with device 160. By doing so, the point to point link between devices 150 and 160 are provisioned—device 150 will use antenna 150D for communications with device 160. Similarly, device 160 will use antenna 160G for communications with device 150.

To accomplish the above automatic configuration, an installer has to configure each of the two devices, one of the which will be a listen mode device. This listen mode device will be configured to listen for transmit messages from the hunt mode device. It should be clear that the hunt mode device would have transmit have a specific identifying characteristic, either an embedded unique address in the transmit message or some other identifier. The listen mode device will thus be configured to receive and detect transmit messages that have this specific identifier. Transmit messages that do not have this identifier may therefore be ignored by the listen mode device. The transmit messages may also contain identifier information which identifies the antenna being used for its transmission.

The installer will then have to configure the hunt mode device to transmit transmit messages that contain the unique identifier expected by the listen mode device. This unique identifier, as noted above, could merely be the hunt mode device's IP address or manufacturing product serial number.

Once the two devices are configured, the automatic antenna selection process automatically selects at least one antenna for each end of the point to point wireless link between the two devices. It should be noted that the provision of multiple antennas on each device simplifies the installation process. Each device installed no longer has to be manually pointed to the devices it has to communicate with as the optimum antenna for this link will be automatically selected.

The above described process, while described for a single antenna selection, may be used to select multiple antennas in one device. To accomplish this, multiple instances of the process may be simultaneously run with each instance of the process alternately taking turns at the multiple antennas. Alternatively, since each instance of the process cycles through each of the available antennas, this cycling can be timed so that none of the different instances of the process simultaneously access the same antenna. It should be mentioned that these different instances can be a mixture of both hunt mode and listen mode processes. It should also be mentioned that multiple links between two devices are possible.

The process executed by a listen mode device is that of sequentially listening for transmit messages using different antennas and then, based on the received transmit messages, choosing an antenna for communications with the hunt mode device. This process may have multiple permutations, two of which are explained below with reference to FIGS. 6 and 6A.

Figure 6:
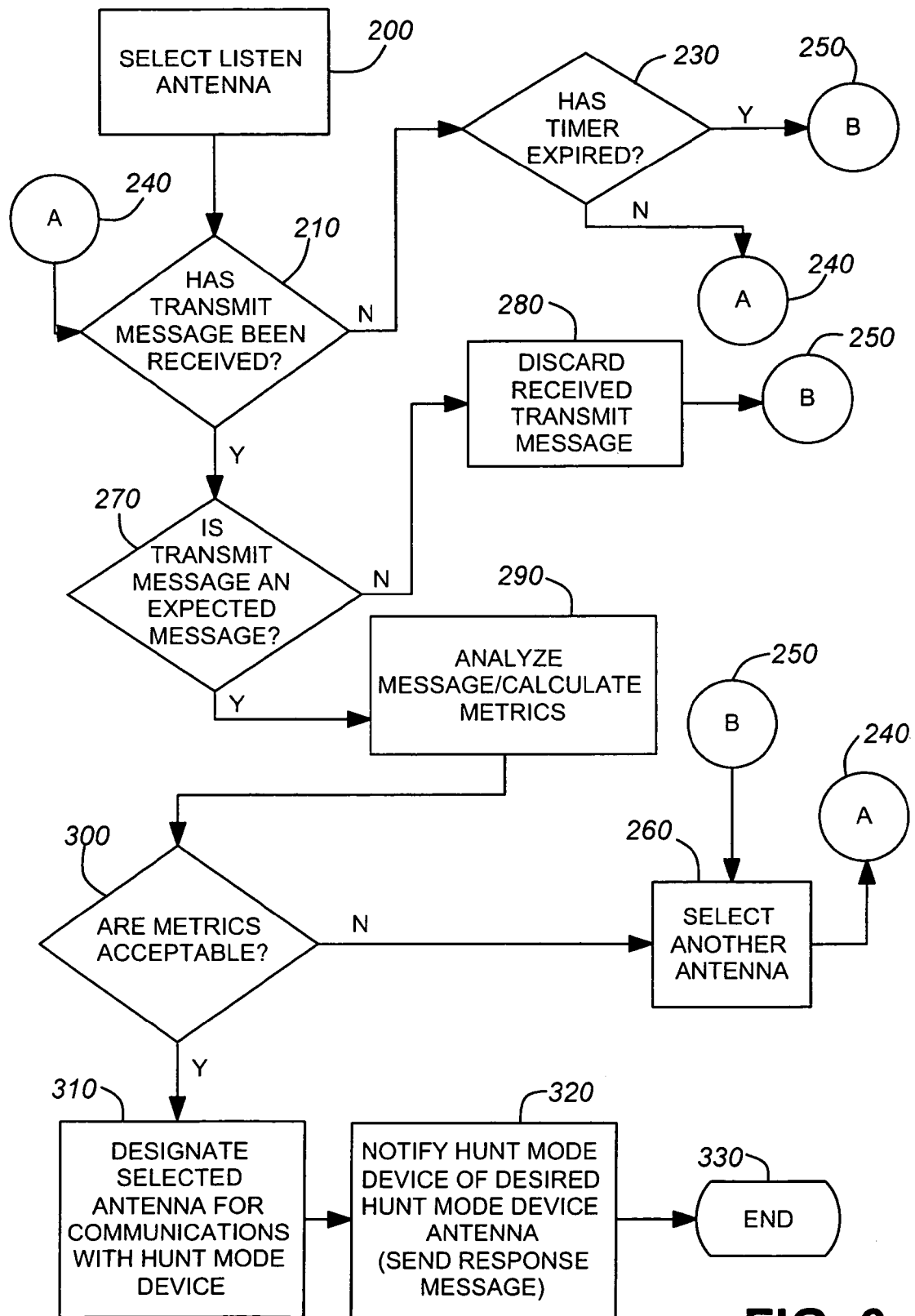
FIG. 6 is a flowchart illustrating the steps in a method executed by a listen mode device.

Referring to FIG. 6, the process begins at step 200 by selecting an antenna to be used for listening for a specific hunt mode device. Once the antenna is selected, the decision 210, that of whether a transmit message has be received, is taken. If no transmit message has been received, then a timer is checked (step 230) as the amount of time spent listening by each antenna is limited. If the timer has not expired, then, through connector 240, the logic flow returns to step 210. If on the other hand, the timer has expired, then, through connector 250, the logic flow proceeds to step 260. Step 260 is that of selecting another antenna for use in listening for the expected transmit message. After selecting another antenna, connector 240 shows that the logic flow returns to step 210.

If a transmit message has been received, then decision 210 leads to decision 270. Decision 270 determines if the transmit message is from the expected hunt mode device. This can be done by examining the contents of the transmit message for the identifying characteristic (such as the hunt mode device's IP address) referred to above. By determining if the received transmit message is from an expected hunt mode device (as there can be multiple devices operating in hunt mode at one time), the listen mode device can determine whether to discard or analyse the received transmit message. Step 280 is discarding the message if the transmit message is not an expected transmit message. Once the "unexpected" transmit message is discarded, connector 250 returns the logic flow chart to the branch denoted by step 260, connector 240, and ultimately, step 210.

On the other hand, if the transmit message is an expected one, then metrics relating to the transmission of the transmit message are calculated (step 290). These metrics may relate to transmission quality, signal strength, reception strength, errors in the transmit message, or any other metric that provides a quantitative measurement of a suitability of the currently selected antenna for communications with the hunt mode device. Once these metrics are calculated, then decision 300 determines if the metrics show that the selected antenna is suitable. If the metrics illustrate an unsuitability for the task, perhaps because the metrics calculated do not meet predetermined thresholds that denote a minimum acceptable level of suitability, then step 260 is that of selecting another antenna. Once another antenna is selected, then the logic flow returns to step 210, effectively restarting the process.

If the result of decision 300 is positive and the calculated metrics are acceptable, then step 310 designates the currently selected antenna for communications with the hunt mode device. It should be noted that the metrics calculated in step 290 may also includes metrics that determine the suitability of a transmitting antenna on the hunt mode device. These metrics therefore also inform the listen mode device of whether the transmitting antenna on the hunt mode device is suitable for communicating with the listen mode device. If the listen mode device determines from the calculated metrics that its selected antenna (based on a comparison of previous selected antennas) is suitable but that the transmitting antenna on the hunt mode device is not suitable, then the selected antenna on the listen mode device is designated but no transmitting antenna is elected yet.

The transmitting antenna on the hunt mode device is selected based on, as noted above, the metrics calculated for it. Once the metrics show that the transmitting antenna is suitable, this suitability is communicated to the hunt mode device by sending a response message (step 320). Identification of the suitable transmitting antennas can be done in numerous ways. In one method, each transmit message contains identification of the antenna which was used for its transmission. This identification can then be extracted by the listen mode device and retransmitted to the hunt mode device. The hunt mode device will thus be informed of which antenna it should use. Clearly, the response message may, in addition to identifying the suitable hunt mode device antenna, identify the listen mode device from whence it came.

In another method, the transmit messages do not contain identification of the transmitting antenna but each hunt mode antenna, after transmitting its transmit message, is allotted a predetermined amount of time during which it can receive response messages (if any). Under this scheme, if a transmit antenna receives a response message from the intended recipient of its transmit message, then this transmit antenna that received a response message is designated for communication with that listen mode device.

Once the listen mode antenna is designated and once the transmit mode device is informed of the suitable antenna that it should use, then the process ends (step 330).

The process outlined above and illustrated in the flowchart of FIG. 6 cycles through each of the listen antennas and, at the first instance of a suitable antenna for communicating with the hunt mode device, the process ends. This process selects an antenna that is "good enough" for communicating with the hunt mode device. To find the "best" or best suited antenna on the listen mode device for communicating with the hunt mode device, the previous metrics for the other antennas have to be saved and compared with one another. This way, the antenna with the 'best" metrics is selected. Such a process is illustrated in the flow chart of FIG. 6A and is explained below.

Figure 6A:
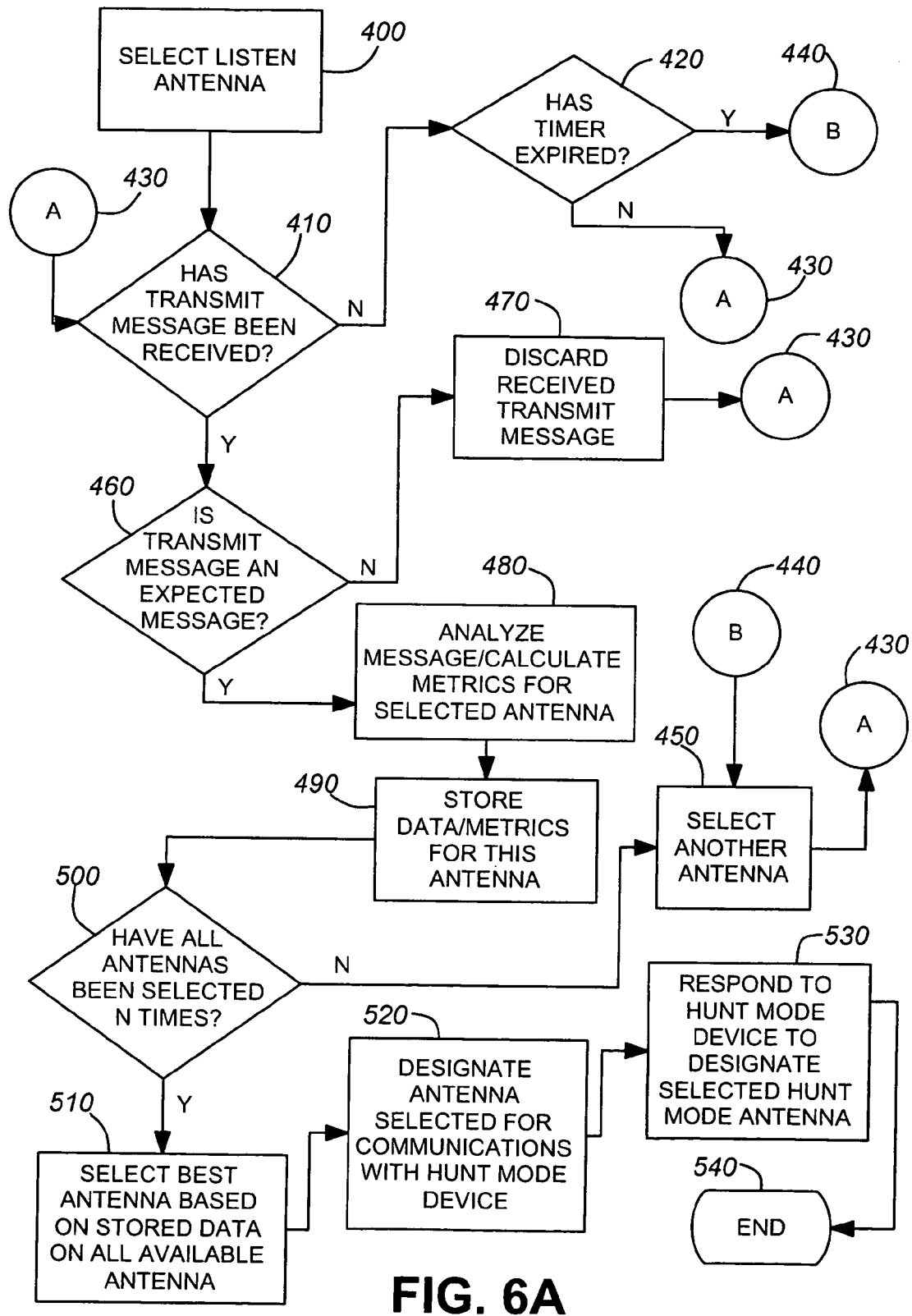
FIG. 6A is a flowchart illustrating the steps in an alternative to the method in FIG. 6.

Referring to FIG. 6A, the listen mode device process starts at step 400 with the selection of an antenna from a pool of available antennas. Decision 410 then determines if a transmit message from the hunt mode device has been received. If not, then decision 420 checks if a timer has expired. This timer allows the listen mode device to only listen for fixed periods of time per antenna. If the timer has expired, then the logic flow returns to decision 410 by way of connector 430. If the timer has expired, then, by way of connector 440, the logic flow causes the listen mode device to select another antenna (step 450). The process effectually then begins anew with decision 410 (by way of connector 430).

If decision 410 is positive, and a transmit message has been received, then decision 460 determines if the received transmit message is from the correct hunt mode device. This can be done using the methods discussed above in relation to the first listen mode device process. If this received transmit message is not expected, then it is discarded (step 470) and the logic flow returns to decision 410 by way of connector 430.

On the other hand, if the received transmit message is from the expected hunt mode device, then the received transmit message is analyzed and the metrics associated with the message are calculated (step 480). This data (the calculated metrics) is then stored and associated with the currently selected antenna (step 490). Decision 500 then checks if all the available antennas have been selected N times. This step thereby determines if data/metrics have been gathered N times for all of the available antennas. It should be noted that N is a programmable natural number and should be selected so as to provide the listen mode device with a suitable database of metrics for the available antennas. If the result of decision 500 is negative, then another antenna is selected (step 450), and the logic flow returns to decision 410.

Once all the available antennas have each been selected N times, then, based on the collected data/metrics, the "best" or most suited antenna for communicating with the hunt mode device is selected (step 510). This antenna selected in step 510 is thus designated for communications with the hunt mode device (step 520).

The penultimate step (step 530) is to respond to the hunt mode device. This step informs the hunt mode device which antenna the hunt mode device should use in communicating with the listen mode device. How this is done depends on the implementation of the hunt mode device. A response message containing an identification of the desired hunt mode device antenna may be sent to the hunt mode device. The hunt mode device can then extract the relevant antenna identifying information from the response message. Alternatively, if the hunt mode device is configured so that any transmitting antenna which receives a response message is the selected antenna, the listen mode device can, using the designated listen mode antenna, send a response message when it detects a transmission from the desired hunt mode antenna.

Once the hunt mode device has been notified of the of the desired antenna to be used in communicating with the listen mode device, the process ends (step 540). To select the optimal hunt mode device antenna, the designated listen mode antenna is used. After this designated antenna is found and designated (using either of the two processes described in FIGS. 6 and 6A), the designated antenna is used to receive and listen to all of the hunt mode device antennas which are sequentially transmitting. Then, based on the transmit messages received from these hunt mode device, one of the hunt mode device antennas is selected by the listen mode device. This selection is then communicated to the hunt mode device.

The process outlined in FIG. 6A can be broken down into two subroutines—a data gathering subroutine (steps 400 to 500 and its loops) and a decision subroutine. In the data gathering subroutine, the listen mode device cycles through the available antennas and gathers data/metrics for each of the available antennas. Once this is done, the decision subroutine (steps 510–540) determines which of the available antennas is best suited for communicating with the hunt mode device.

Figure 7:
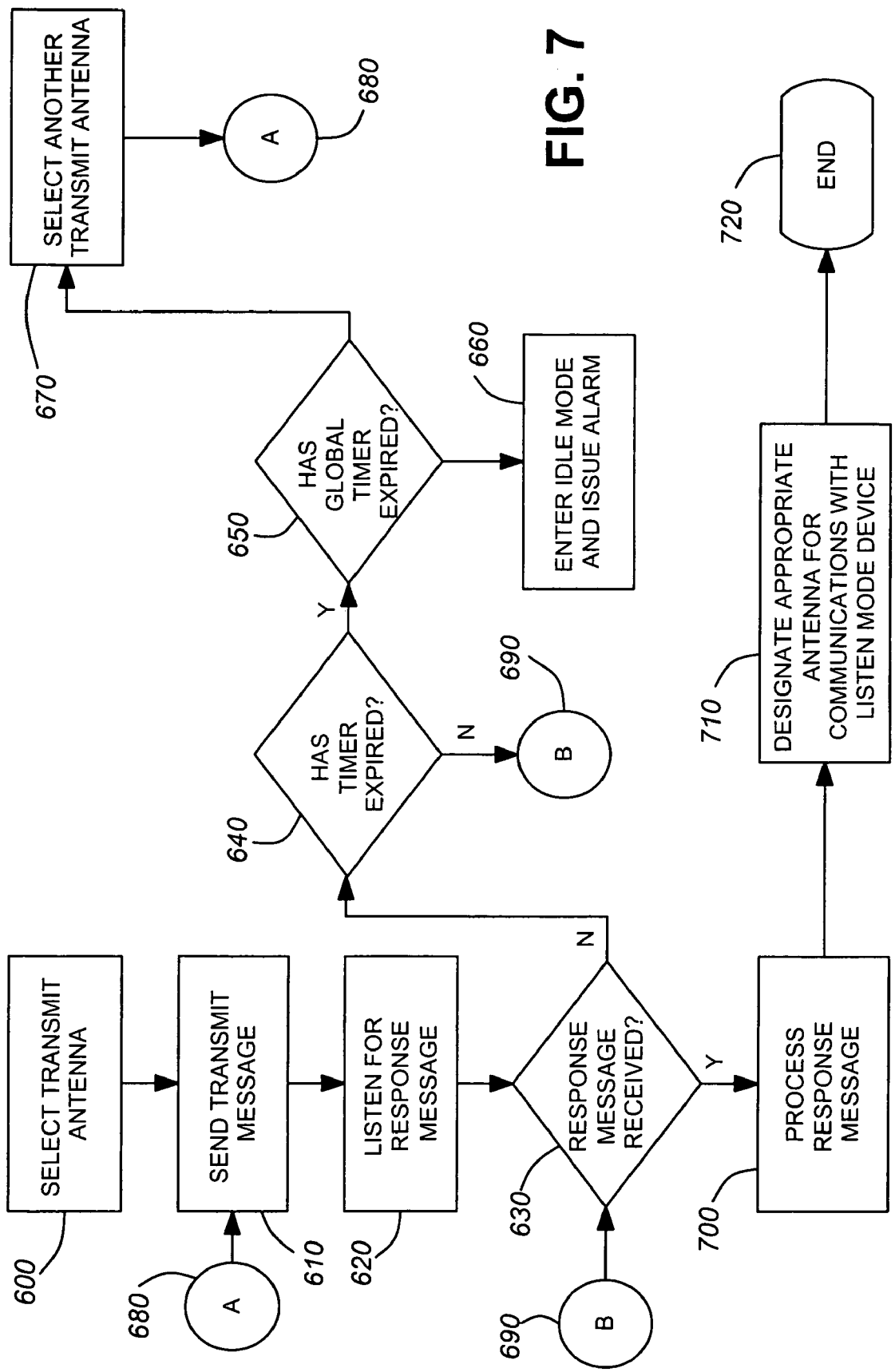
FIG. 7 is a flowchart illustrating the steps in a method executed by a hunt mode device.

While the processes above is for a device in the listen mode, a device in the hunt mode executes a different process. While there are similarities, such as the cycling through the available antennas, the two processes are different. The hunt mode process is illustrated in the flowchart of FIG. 7.

The process begins with the selection of an antenna to be used on the hunt mode device (step 600). This antenna is, much as in the listen mode, to be selected from a pool of available antennas.

Once an antenna has been selected, a transmit message is sent to the listen mode device through the selected antenna (step 610). Depending on the method used (as explained above) this transmit message may or may not contain an identification of the antenna being used for its transmission. However, the transmit message should have an identification of which hunt mode device is transmitting it.

After transmission, the hunt mode device then listens for a response message (step 620). Decision 630 queries if a response message has been received. If a response message has not been received, then a timer which tracks the time window for receiving response messages, is checked (step 640). If the timer has expired, then decision 650 determines if a global timer (which keeps track of how long the device has been in hunt mode) is checked. If the global timer has expired, then the device enters an idle mode and an alarm is raised (step 660). Otherwise, another antenna is selected and, through connector 680, the process begins anew at step 610. If the timer has not expired (from decision 640), then, through connector 690, the logic flow returns to step 630.

If a response message has been received, then that response message is processed (step 700). This processing may involve any of the following: checking if the response message is from an expected listen mode device, extracting information regarding which hunt mode device antenna should be used, and any other processing which may be required.

After the processing of the response message, and assuming that the processing succeeds, then one of the hunt mode antennas is designated for use in communicating with that specific listen mode device (step 710). This hunt mode antenna may have been identified in the response message received or it may have been identified by receiving the response message during that hunt mode device antenna's "listen" period. Again, this depends on the method used by both the hunt mode device and the listen mode device to identify the preferred antenna on the hunt mode device. The process then ends (step 720).

The above invention is ideally suited for wireless backhaul mesh networks such as that disclosed in U.S. patent application Ser. No. 10/183,730 filed on Jun. 28, 2002 entitled INTEGRATED WIRELESS DISTRIBUTION AND BACKHAUL NETWORKS, the whole of which is hereby incorporated by reference. It may also be used for any other point to point communications network.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

We claim:

1. A method for selecting antennas for use by a first wireless device for communicating with a second wireless device and for selecting antennas for use by said second wireless device for use in communicating with said first wireless device, said first and second wireless devices each having a plurality of antennas, the method comprising:
   a) configuring said first wireless device to operate in a hunt mode, said hunt mode causing said first wireless device to send transmit messages to said second wireless device, said transmit messages containing information for uniquely identifying said first wireless device to said second wireless device as an origin of said transmit messages;
   b) configuring said second wireless device to operate in a listen mode, said listen mode causing said second wireless device to await transmit messages from said first wireless device, said second wireless device being configured to reject messages not originating from said first wireless device;
   c) executing the following steps on said first wireless device:
      c1) selecting a first selected antenna at said first wireless device from said plurality of antennas at said first wireless device;
      c2) transmitting transmit messages from said first wireless device using said first selected antenna, said transmit messages indicating an identity of said first selected antenna;
      c3) determining if response messages from said second wireless device have been received by said first wireless device and determining if a timer for said first selected antenna has expired;
      c4) in the event said response messages have been received by said first wireless device from said second wireless device, designating one of said plurality of antennas on said first wireless device as being for use in communications with said second wireless device based on contents of said response messages;
      c5) in the event said timer has expired, repeating steps c1)–c5) for each one of said plurality of antennas on said first wireless device,
   d) concurrently with steps c1)–c5) executing the following steps on said second wireless device:
      d1) selecting a second selected antenna at said second wireless device from said plurality of antennas at said second wireless device;
      d2) receiving transmit messages at said second wireless device using said second selected antenna;
      d3) determining a quality of said transmit messages and saving data related to said quality for said second selected antenna;
      d4) determining a quality of said transmit messages from different antennas on said first wireless device and saving data related to said quality for said different antennas on said first wireless device;
      d5) repeating steps d2)–d4) for each of said plurality of antennas on said second wireless device;
      d6) designating one of said plurality of antennas on said second wireless device as being for use in communicating with said first wireless device based on said data saved in step d3);
      d7) designating one of said plurality of antennas on said first wireless device as being for use in communicating between said first wireless device and said second wireless device based on data saved in step d4);
      d8) transmitting response messages from said second wireless device to said first wireless device using an antenna designated in step d4), said response messages uniquely identifying said second wireless device as an origin of said response messages, said response messages indicating which of said plurality of antennas on said first wireless device is designated as being for use by said first wireless device in communicating between said first wireless device and said second wireless device.

2. A method according to claim 1 wherein steps d2)–d4) are repeated N times for each of said plurality of antennas on said second wireless device, N being a natural number.

3. A method according to claim 1 wherein at least one of said plurality of antennas is a directional antenna.

4. A method according to claim 1 wherein step d4) includes calculating a metric indicative of a transmission quality of a signal from said first wireless device.

5. A method according to claim 1 wherein said quality relates to a quantitative measurement of a suitability of said second selected antenna for communications with said first wireless device.

6. A method according to claim 1 wherein step d4) includes calculating at least one metric selected from a group comprising:
   signal strength of a signal from said first wireless device;
   bit error rate;
   packet error rate;
   soft decision threshold;
   delay spread; and
   interference.

7. A method according to claim 1 further including the step of checking a global timer on said first wireless device, step c5) being executed in the event said global timer has not expired, an expiry of said global timer indicating an error in said first wireless device.

8. A method according to claim 1 wherein at least one of said first wireless device and said second wireless device is a node in a wireless backhaul network.

* * * * *

UNITED STATES PATENT AND TRADEMARK OFFICE
CERTIFICATE OF CORRECTION

PATENT NO.        : 7,171,223 B2
APPLICATION NO.   : 10/340148
DATED             : January 30, 2007
INVENTOR(S)       : Bernard Herscovich et al.

Page 1 of 1

It is certified that error appears in the above-identified patent and that said Letters Patent is hereby corrected as shown below:

In claim 1, at column 14, line 28, "d4)" should be changed to --d6)--.

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,171,223 B2  
APPLICATION NO. : 10/340148  
DATED : January 30, 2007  
INVENTOR(S) : Herscovich et al.

Page 1 of 1

It is certified that error appears in the above-identified patent and that said Letters Patent is hereby corrected as shown below:

In Column 8, Line 23, delete "1 50D" and insert -- 150D --, therefor.

In Column 9, Line 21, delete "If" and insert -- If, --, therefor.

Signed and Sealed this  
Fifth Day of February, 2013

Teresa Stanek Rea  
*Acting Director of the United States Patent and Trademark Office*